(12) United States Patent
Kubota

(10) Patent No.: US 9,124,425 B2
(45) Date of Patent: Sep. 1, 2015

(54) SYSTEMS, METHODS, AND APPARATUSES FOR CIPHERING ERROR DETECTION AND RECOVERY

(75) Inventor: Keiichi Kubota, Weybridge (GB)

(73) Assignee: Nokia Technologies Oy, Espoo (FI)

( * ) Notice: Subject to any disclaimer, the term of this patent is extended or adjusted under 35 U.S.C. 154(b) by 697 days.

(21) Appl. No.: 12/494,957

(22) Filed: Jun. 30, 2009

(65) Prior Publication Data

US 2010/0332933 A1 Dec. 30, 2010

(51) Int. Cl.
*H04N 7/167* (2011.01)
*H04L 9/12* (2006.01)
*H04W 12/02* (2009.01)

(52) U.S. Cl.
CPC ............ *H04L 9/12* (2013.01); *H04W 12/02* (2013.01); *H04L 2209/80* (2013.01)

(58) Field of Classification Search
USPC ........................................................ 380/225
See application file for complete search history.

(56) References Cited

U.S. PATENT DOCUMENTS

| | | | | |
|---|---|---|---|---|
| 5,694,473 | A * | 12/1997 | Bright et al. | 380/42 |
| 6,161,207 | A * | 12/2000 | Lockhart et al. | 714/758 |
| 7,093,040 | B1 | 8/2006 | Mach | |
| 7,388,883 | B2 | 6/2008 | Jiang | |
| 7,706,537 | B2 | 4/2010 | Yi et al. | |
| 7,870,496 | B1 * | 1/2011 | Sherwani | 715/761 |
| 8,045,517 | B2 * | 10/2011 | So et al. | 370/329 |
| 8,098,771 | B2 * | 1/2012 | Herrmann | 375/340 |
| 2003/0091048 | A1 | 5/2003 | Jiang | |
| 2004/0015768 | A1 | 1/2004 | Bordes et al. | |
| 2004/0147236 | A1 | 7/2004 | Parkvall et al. | |
| 2005/0270996 | A1 | 12/2005 | Yi et al. | |
| 2006/0050679 | A1 | 3/2006 | Jiang | |
| 2007/0206673 | A1 | 9/2007 | Cipolli et al. | |
| 2007/0258591 | A1 | 11/2007 | Terry et al. | |
| 2007/0291855 | A1 * | 12/2007 | Reznic et al. | 375/240.27 |

(Continued)

FOREIGN PATENT DOCUMENTS

CA 2 531 411 A1 6/2007
CN 1445968 A 10/2003

(Continued)

OTHER PUBLICATIONS

International Search Report and Written Opinion for Application No. PCT/FI2010/050509 dated Oct. 11, 2010.

(Continued)

*Primary Examiner* — Christopher Brown
(74) *Attorney, Agent, or Firm* — Alston & Bird LLP

(57) ABSTRACT

Systems, methods, and apparatuses are provided for ciphering error detection and recovery. A method may include using a first set of one or more cipher input parameters to decipher ciphered data ciphered using a second set of one or more cipher input parameters. The method may further include comparing a value of at least a portion of the deciphered data to an expected value. The method may additionally include determining an occurrence of a ciphering error when the value of the at least a portion of the deciphered data is not equal to the expected value. The method may also include initiating a ciphering resynchronization procedure in response to the determination that a ciphering error occurred so as to resynchronize at least one of the first set of cipher input parameters with at least one of the second set of cipher input parameters. Corresponding systems and apparatuses are also provided.

20 Claims, 6 Drawing Sheets

(56) References Cited

U.S. PATENT DOCUMENTS

| | | | |
|---|---|---|---|
| 2008/0137652 A1* | 6/2008 | Herrmann et al. | 370/389 |
| 2010/0034187 A1 | 2/2010 | Kumar et al. | |
| 2010/0034383 A1* | 2/2010 | Turk | 380/262 |
| 2010/0136995 A1 | 6/2010 | Yi et al. | |
| 2010/0332933 A1 | 12/2010 | Kubota | |

FOREIGN PATENT DOCUMENTS

| | | |
|---|---|---|
| EP | 1 337 125 A2 | 8/2003 |
| EP | 1635510 A2 | 3/2006 |
| EP | 2 091 177 AI | 8/2009 |
| JP | 2003-339075 | 11/2003 |
| JP | 2005-518135 | 6/2005 |
| JP | 2006-087097 | 3/2006 |
| JP | 2006-87097 A | 3/2006 |
| JP | 2006-217100 | 8/2006 |
| JP | 2009-122831 | 6/2009 |
| JP | 2012 531778 A | 12/2012 |
| WO | WO 87/03442 A1 | 6/1987 |
| WO | WO 2008 072292 A1 | 6/2008 |
| WO | WO 2008/156301 A2 | 12/2008 |
| WO | WO-2010/086490 A1 | 8/2010 |
| WO | WO-2011/001022 A1 | 1/2011 |

OTHER PUBLICATIONS

Office Action for U.S. Appl. No. 12/363,001 dated Jul. 18, 2011.
International Search Report and favorable Written Opinion issued in connection with International Application No. PCT/FI2009/051039 and mailed on Apr. 19, 2010.
Graham Charles, et al.; U.S. Appl. No. 12/363,001, filed Jan. 30, 2009; For "*Method, Apparatus and Computer Program Product for Providing Ciphering Problem Recovery for Unacknowledged Mode Radio Bearer*".
3GPP TS 25.322, V8.5.0; "*3rd Generation Partnership Project; Technical Specification Group Radio Access Network; Radio Link Control (RLC) Protocol Specification (Release 8)*", Jun. 2009.
3GPP TS 25.323, V8.4.1; "*3rd Generation Partnership Project; Technical Specification Group Radio Access Network; Packet Data Convergence Protocol (PDCP) Specification (Release 8)*", Jun. 2009.
3GPP TS 33.102, V8.3.0; "*3rd Generation Partnership Project; Technical Specification Group Services and System Aspects; 3G Security; Security Architecture (Release 8)*", Jun. 2009.
3GPP TS 36.323, V8.6.0; "*3rd Generation Partnership Project; Technical Specification Group Radio Access Network; Evolved Universal Terrestrial Radio Access (E-UTRA); Packet Data Convergence Protocol (PDCP) Specification (Release 8)*", Jun. 2009.
Office Action for Kazakhstan Application No. 2012/1508.1; dated Aug. 28, 2013.
Mexican Office Action for Application No. MX/a/2011/050509, dated Sep. 6, 2013.
Office Action for Canadian Application No. 2,766,198; dated Sep. 5, 2013.
Office Action for Chilean Application No. 2011/003230; dated Aug. 16, 2013.
Substantive Examination Report for Philippines Application No. 1/2011/502658 received Oct. 22, 2013.
Office Action for Korean Application No. 2012-7002391 dated Apr. 16, 2014.
Office Action for Chinese Application No. 201080028961.3 dated May 26, 2014.
Substantive Examination for Malaysian Application No. PI 2011006300 dated May 15, 2014.
Office Action for Vietnamese Application No. 1-2011-03585 dated Apr. 28, 2014.
Office Action for Japanese Application No. 2012-516809; dated Apr. 23, 2013.
Office Action for Mexican Application No. MX/a/2011/013938 dated Jun. 14, 2013.
Communication from Korean Patent Application No. 2011-702011, dated Aug. 14, 2012.
Communication from Russian Patent Application No. 2011135623, dated Dec. 6, 2012.
"*ETSI TS 25.331 V8.5.0—Universal Mobile Telecommunications Systems (UMTS); Radio Resource Control (RRC);Protocol Specification (3GPP TS 25.331 version 8.5.0 Release 8);*" dated Dec. 2008;subclauses 8.3.1.6 (pp. 205-213) and 8.6.6.28 (pp. 414-416); retrieved on Mar. 17, 2014 from<http://www.3gpp.org/DynaReport/25331.htm>.
"*Discussion of handling of RLC UM error and ciphering issued during CS-HSPA;*" 3GPP TSG-RAN WG2 Meeting #65; R2-091502; dated Jan. 9-13, 2009.
Office Action for Chilean Application No. 2011/001814; dated Feb. 5, 2013.
Office Action for Japanese Application No. 2011-546889; dated Jan. 28, 2013.
Office Action for U.S. Appl. No. 12/363,001; dated Jul. 20, 2012.
Subsequent Substantive Examination Report for Philippines Application No. 1/2011/502658; dated Feb. 12, 2014.
Written Opinion for Singapore Application No. 201109673-2 dated Jan. 21, 2013.
Office Action for Russian Application No. 2012101495 dated Jan. 18, 2013.
Office Action from Chinese Patent Application No. 201080028961.3 dated Jan. 26, 2015.
Office Action from Philippine Application No. 1/2011/502658 mailed Mar. 31, 2015.

* cited by examiner

SYSTEMS, METHODS, AND APPARATUSES FOR CIPHERING ERROR DETECTION AND RECOVERY

TECHNOLOGICAL FIELD

Embodiments of the present invention relate generally to communication technology and, more particularly, relate to systems, methods, and apparatuses for ciphering error detection and recovery.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer and providing convenience to users. In parallel with the expansion of networks, mobile computing devices have been developed that take advantage of features offered by wireless networks to facilitate mobile computing. As a result, mobile communication devices and wireless networks are widely used by consumers to support mobile computing use for a wide range of communications.

In order to inhibit a third party from compromising the privacy of network communications data, at least some of the data may be encrypted. Engaging in encrypted communication may require a receiving entity to use a first set of one or more cipher input parameters to decipher received ciphered data. The first set of cipher input parameters may need to be synchronized with a second set of one or more cipher input parameters used by a sending entity to cipher the data so as to ensure accurate deciphering of the ciphered data by the receiving entity. When the first and second sets of cipher input parameters are out of synchronization, a ciphering error may occur in that the receiving entity may not be able to accurately decipher the ciphered data.

BRIEF SUMMARY OF SOME EXAMPLES OF THE INVENTION

Systems, methods, apparatuses, and computer program products are therefore provided for ciphering error detection and recovery. In this regard, methods, apparatuses, and computer program products are provided that may provide several advantages to computing devices, computing device users, and network operators. Embodiments of the invention provide a receiving apparatus configured to determine an occurrence of a ciphering error. In this regard, embodiments of the invention provide a receiving apparatus configured to determine an occurrence of a ciphering error by comparing a value of deciphered data to an expected value to determine if the value of the deciphered data is equal to the expected value. This comparison allows for some embodiments of the invention to determine an occurrence of a ciphering error regardless of a service type with which a ciphered protocol data unit is associated. Embodiments of the invention further provide a receiving apparatus configured to initiate a ciphering error recovery procedure so as to resynchronize a local set of one or more cipher input parameters used to decipher received ciphered data with a set of one or more cipher input parameters used by a sending apparatus to cipher the ciphered data prior to transmission to the terminal. Some embodiments of the invention provide a receiving apparatus configured to initiate a radio link control resynchronization with a sending apparatus to resynchronize one or more cipher input parameters. Embodiments of the invention also provide a receiving apparatus configured to autonomously resynchronize one or more cipher input parameters by selecting a most probable alternative value for at least one cipher input parameter.

In a first example embodiment, a method is provided, which comprises using a first set of one or more cipher input parameters to decipher ciphered data in a received protocol data unit. In the method of this embodiment, the ciphered data was ciphered using a second set of one or more cipher input parameters. The method of this embodiment further comprises comparing a value of at least a portion of the deciphered data to an expected value. The method of this embodiment also comprises determining an occurrence of a ciphering error when the value of the at least a portion of the deciphered data is not equal to the expected value. The method of this embodiment additionally comprises initiating a ciphering resynchronization procedure in response to the determination that a ciphering error occurred so as to resynchronize at least one of the first set of cipher input parameters with at least one of the second set of cipher input parameters.

In another example embodiment, an apparatus is provided. The apparatus of this embodiment comprises at least one processor and at least one memory storing computer program code, wherein the at least one memory and stored computer program code are configured to, with the at least one processor, cause the apparatus to at least use a first set of one or more cipher input parameters to decipher ciphered data in a received protocol data unit. In the apparatus of this embodiment, the ciphered data was ciphered using a second set of one or more cipher input parameters. The at least one memory and stored computer program code are configured to, with the at least one processor, further cause the apparatus of this embodiment to compare a value of at least a portion of the deciphered data to an expected value. The at least one memory and stored computer program code are configured to, with the at least one processor, additionally cause the apparatus of this embodiment to determine an occurrence of a ciphering error when the value of the at least a portion of the deciphered data is not equal to the expected value. The at least one memory and stored computer program code are configured to, with the at least one processor, also cause the apparatus of this embodiment to initiate a ciphering resynchronization procedure in response to the determination that a ciphering error occurred so as to resynchronize at least one of the first set of cipher input parameters with at least one of the second set of cipher input parameters.

In another example embodiment, a computer program product is provided. The computer program product includes at least one computer-readable storage medium having computer-readable program instructions stored therein. The computer-readable program instructions may include a plurality of program instructions. Although in this summary, the program instructions are ordered, it will be appreciated that this summary is provided merely for purposes of example and the ordering is merely to facilitate summarizing the computer program product. The example ordering in no way limits the implementation of the associated computer program instructions. The first program instruction of this embodiment is configured for using a first set of one or more cipher input parameters to decipher ciphered data in a received protocol data unit. The ciphered data of this embodiment was ciphered using a second set of one or more cipher input parameters. The second program instruction of this embodiment is configured for comparing a value of at least a portion of the deciphered data to an expected value. The third program instruction of this embodiment is configured for determining an occurrence of a ciphering error when the value of the at least a portion of the deciphered data is not equal to the expected value. The fourth program instruction of this embodiment is configured for initiating a ciphering resynchronization procedure in response to the determination that a ciphering error occurred so as to resynchronize at least one of the first set of cipher input parameters with at least one of the second set of cipher input parameters.

In another example embodiment, an apparatus is provided that comprises means for using a first set of one or more cipher input parameters to decipher ciphered data in a received protocol data unit. The ciphered data of this embodiment was ciphered using a second set of one or more cipher input parameters. The apparatus of this embodiment further comprises means for comparing a value of at least a portion of the deciphered data to an expected value. The apparatus of this embodiment additionally comprises means for determining an occurrence of a ciphering error when the value of the at least a portion of the deciphered data is not equal to the expected value. The apparatus of this embodiment also comprises means for initiating a ciphering resynchronization procedure in response to the determination that a ciphering error occurred so as to resynchronize at least one of the first set of cipher input parameters with at least one of the second set of cipher input parameters.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

DETAILED DESCRIPTION

Figure 1:
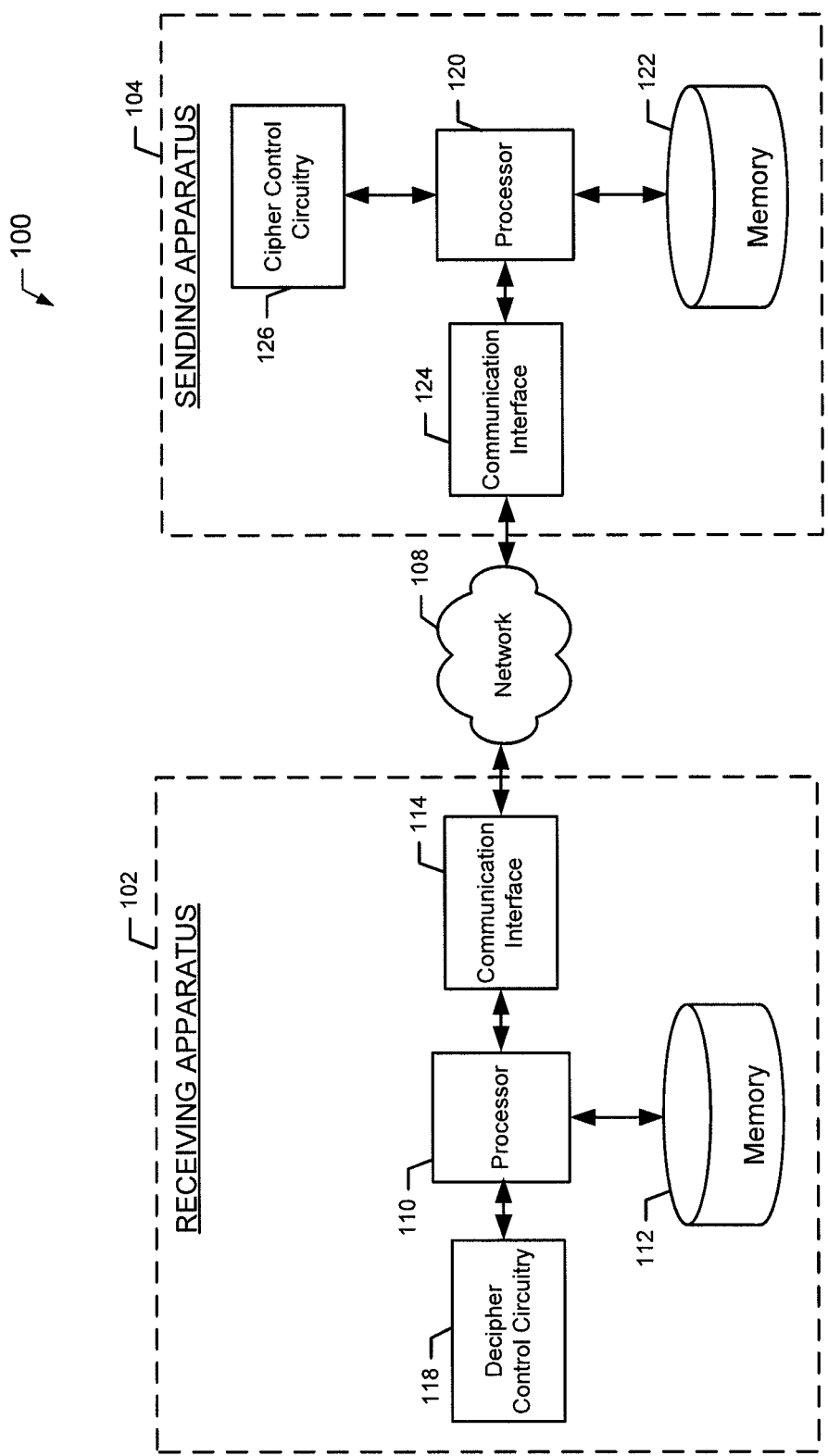
FIG. 1 illustrates a system for ciphering error detection and recovery according to an exemplary embodiment of the present invention.

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

FIG. 1 illustrates a block diagram of a system 100 for ciphering error detection and recovery according to an exemplary embodiment of the present invention. As used herein, "exemplary" merely means an example and as such represents one example embodiment for the invention and should not be construed to narrow the scope or spirit of the invention in any way. It will be appreciated that the scope of the invention encompasses many potential embodiments in addition to those illustrated and described herein. As such, while FIG. 1 illustrates one example of a configuration of a system for ciphering error detection and recovery, numerous other configurations may also be used to implement embodiments of the present invention.

In at least some embodiments, the system 100 includes a receiving apparatus 102 in communication with a sending apparatus 104 over a network 108. The network 108 may comprise a wireless network, wireline network, or combination thereof. In one embodiment, the network 108 comprises a cellular network or public land mobile network, such as may be configured to operate in accordance with Third Generation Partnership Project (3GPP) standards. The network 108 may comprise the Internet.

The receiving apparatus 102 may be embodied as one or more computing devices. For example, the receiving apparatus 102 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like configured to receive data over the network 108 that has been ciphered and/or transmitted by the sending apparatus 104. As another example, the receiving apparatus 102 may comprise a network node (e.g., a radio network controller (RNC), a mobility management entity (MME), or the like) configured to decipher data transmitted by the sending apparatus 104, an access point (e.g., a base station, node B, evolved node B, and/or other network access point) configured to provide access to the network 108, receive ciphered data from the sending apparatus 104, any other network node configured to perform at least some functionality attributed to the sending apparatus 104 herein, some combination thereof, or the like.

The sending apparatus 104 may likewise be embodied as one or more computing devices. For example, the sending apparatus 104 may be embodied as a desktop computer, laptop computer, mobile terminal, mobile computer, mobile phone, mobile communication device, game device, digital camera/camcorder, audio/video player, television device, radio receiver, digital video recorder, positioning device, any combination thereof, and/or the like configured to cipher and/or transmit ciphered data over the network 108 to the receiving apparatus 102. As another example, the sending apparatus 104 may comprise a network node (e.g., a radio network controller (RNC), a mobility management entity (MME), or the like) configured to cipher data for transmission to the receiving apparatus 102, an access point (e.g., a base station, node B, evolved node B, and/or other network access point) configured to provide access to the network 108 and transmit ciphered data to the receiving apparatus 102, any other network node configured to perform at least some functionality attributed to the sending apparatus 104 herein, some combination thereof, or the like.

Figure 2:
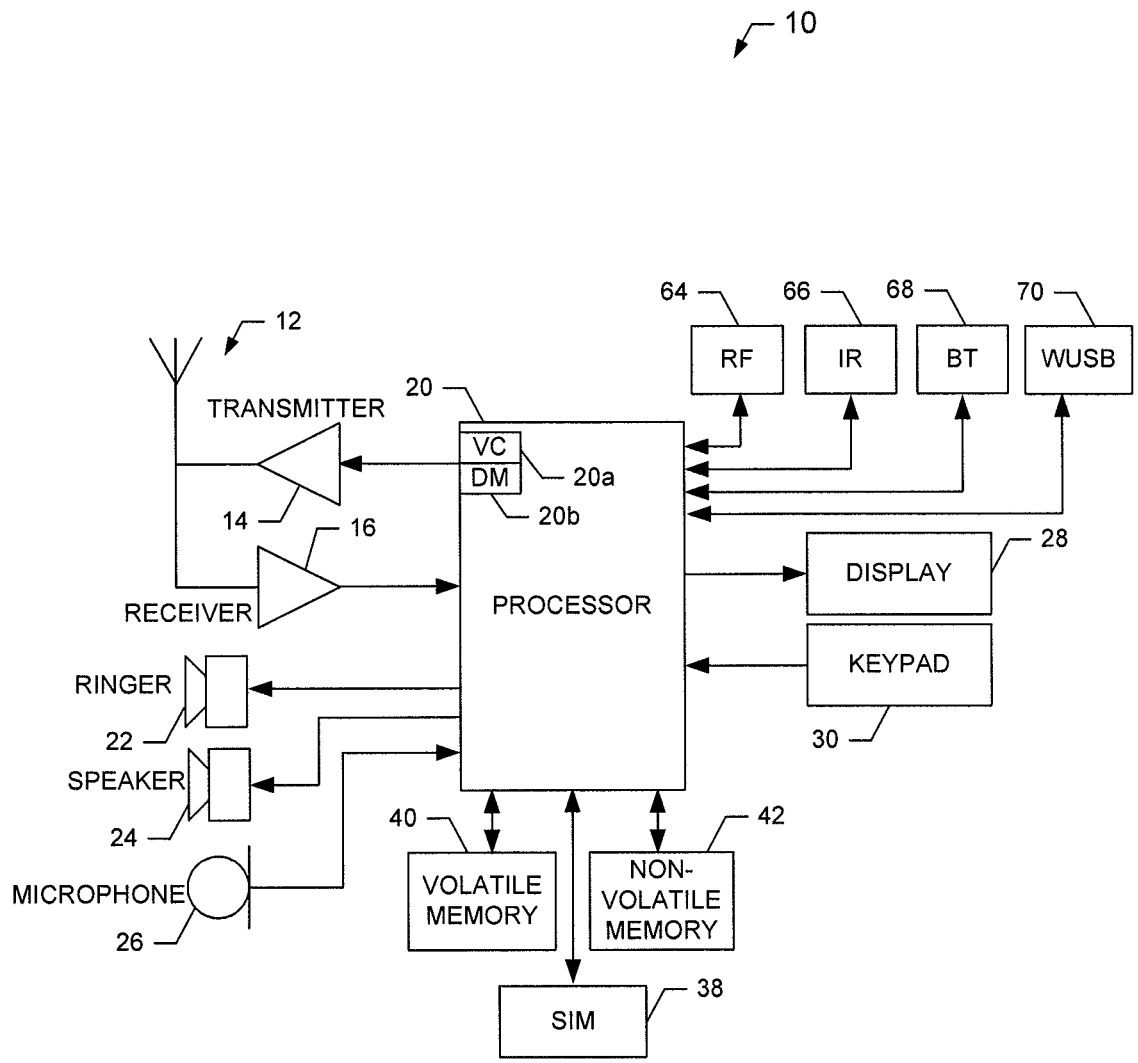
FIG. 2 is a schematic block diagram of a mobile terminal according to an exemplary embodiment of the present invention.

In an exemplary embodiment, the receiving apparatus 102 and/or sending apparatus 104 are embodied as a mobile terminal, such as that illustrated in FIG. 2. In this regard, FIG. 2 illustrates a block diagram of a mobile terminal 10 representative of one embodiment of a receiving apparatus 102 and/or sending apparatus 104 in accordance with embodiments of the present invention. It should be understood, however, that the mobile terminal 10 illustrated and hereinafter described is merely illustrative of one type of receiving apparatus 102 and/or sending apparatus 104 that may implement and/or benefit from embodiments of the present invention and, therefore, should not be taken to limit the scope of the present invention. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ embodiments of the present invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wireless-Fidelity (Wi-Fi), wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may, for example, be configured to transmit and/or receive data transmitted in accordance with high-speed downlink packet access (HSDPA) protocol, high-speed uplink packet access (HSUPA) protocol, and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wireless Fidelity (Wi-Fi) or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor 20 may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the internet or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wireless Fidelity (Wi-Fi), WLAN techniques such as IEEE 802.11 techniques, IEEE 802.16 techniques, and/or the like.

The mobile terminal 10 may comprise memory, such as a subscriber identity module (SIM) 38, a removable user identity module (R-UIM), a universal subscriber identity module (USIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning now to FIG. 1, in an exemplary embodiment the receiving apparatus 102 includes various means, such as a processor 110, memory 112, communication interface 114, and decipher control circuitry 118 for performing the various functions herein described. These means of the receiving apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g. the processor 110), or some combination thereof.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the receiving apparatus 102 as described herein. The plurality of processors may be embodied on a single computing device or distributed across a plurality of computing devices collectively configured to perform one or more functionalities of the receiving apparatus 102 as described herein. In embodiments wherein the receiving apparatus 102 is embodied as a mobile terminal 10, the processor 110 may be embodied as or comprise the processor 20. In an exemplary embodiment, the processor 110 is configured to execute instructions stored in the memory 112 or otherwise accessible to the processor 110. These instructions, when executed by the processor 110, may cause the receiving apparatus 102 to perform one or more of the functionalities of the receiving apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may include, for example, volatile and/or non-volatile memory. Although illustrated in FIG. 1 as a single memory, the memory 112 may comprise a plurality of memories. The memory 112 may comprise volatile memory, non-volatile memory, or some combination thereof. In this regard, the memory 112 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the receiving apparatus 102 is embodied as a mobile terminal 10, the memory 112 may comprise the volatile memory 40 and/or the non-volatile memory 42. The memory 112 may be configured to store information, data, applications, instructions, or the like for enabling the receiving apparatus 102 to carry out various functions in accordance with exemplary embodiments of the present invention. For example, in at least some embodiments, the memory 112 is configured to buffer input data for processing by the processor 110. Additionally or alternatively, in at least some embodiments, the memory 112 is configured to store program instructions for execution by the processor 110. The memory 112 may store information in the form of static and/or dynamic information. This stored information may be stored and/or used by the decipher control circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to an entity of the system 100, such as, for example, a sending apparatus 104. In at least one embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more entities of the system 100. The communication interface 114 may be configured to receive and/or transmit data using any protocol that may be used for communications between entities of the system 100. The communication interface 114 may additionally be in communication with the memory 112 and/or decipher control circuitry 118, such as via a bus.

The decipher control circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in one embodiment, is embodied as or otherwise controlled by the processor 110. In embodiments wherein the decipher control circuitry 118 is embodied separately from the processor 110, the decipher control circuitry 118 may be in communication with the processor 110. The decipher control circuitry 118 may comprise and/or be configured to perform at least some functionality of a radio link control (RLC) entity, packet data convergence protocol (PDCP) entity, and/or the like. The decipher control circuitry 118 may further be in communication with one or more of the memory 112 or communication interface 114, such as via a bus.

Referring now to the sending apparatus 104, in an exemplary embodiment the sending apparatus 104 includes various means, such as a processor 120, memory 122, communication interface 124, and cipher control circuitry 126 for performing the various functions herein described. These means of the sending apparatus 104 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 122) that is executable by a suitably configured processing device (e.g., the processor 120), or some combination thereof.

The processor 120 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 120 comprises a plurality of processors. The plurality of processors may be in operative communication with each other and may be collectively configured to perform one or more functionalities of the sending apparatus 104 as described herein. The plurality of processors may be embodied on a single computing device or distributed across a plurality of computing devices collectively configured to perform one or more functionalities of the sending apparatus 104 as described herein. In embodiments wherein the sending apparatus 104 is embodied as a mobile terminal 10, the processor 120 may be embodied as or comprise the processor 20. In an exemplary embodiment, the processor 120 is configured to execute instructions stored in the memory 122 or otherwise accessible to the processor 120. These instructions, when executed by the processor 120, may cause the sending apparatus 104 to perform one or more of the functionalities of the sending apparatus 104 as described herein. As such, whether configured by hardware or software methods, or by a combination thereof, the processor 120 may comprise an entity capable of performing operations according to embodiments of the present invention while configured accordingly. Thus, for example, when the processor 120 is embodied as an ASIC, FPGA or the like, the processor 120 may comprise specifically configured hardware for conducting one or more operations described herein. Alternatively, as another example, when the processor 120 is embodied as an executor of instructions, such as may be stored in the memory 122, the instructions may specifically configure the processor 120 to perform one or more algorithms and operations described herein.

The memory 122 may include, for example, volatile and/or non-volatile memory. Although illustrated in FIG. 1 as a single memory, the memory 122 may comprise a plurality of memories. The plurality of memories may be embodied on a single computing device or distributed across a plurality of computing devices. The memory 122 may comprise volatile memory, non-volatile memory, or some combination thereof. In this regard, the memory 122 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the sending apparatus 104 is embodied as a mobile terminal 10, the memory 122 may comprise the volatile memory 40 and/or the non-volatile memory 42. The memory 122 may be configured to store information, data, applications, instructions, or the like for enabling the sending apparatus 104 to carry out various functions in accordance with exemplary embodiments of the present invention. For example, in at least some embodiments, the memory 122 is configured to buffer input data for processing by the processor 120. Additionally or alternatively, in at least some embodiments, the memory 122 is configured to store program instructions for execution by the processor 120. The memory 122 may store information in the form of static and/or dynamic information. This stored information may be stored and/or used by the cipher control circuitry 126 during the course of performing its functionalities.

The communication interface 124 may be embodied as any device or means embodied in circuitry, hardware, a computer program product comprising computer readable program instructions stored on a computer readable medium (e.g., the memory 122) and executed by a processing device (e.g., the processor 120), or a combination thereof that is configured to receive and/or transmit data from/to an entity of the system 100, such as, for example, a receiving apparatus 102. In at least one embodiment, the communication interface 124 is at least partially embodied as or otherwise controlled by the processor 120. In this regard, the communication interface 124 may be in communication with the processor 120, such as via a bus. The communication interface 124 may include, for example, an antenna, a transmitter, a receiver, a transceiver and/or supporting hardware or software for enabling communications with one or more entities of the system 100. The communication interface 124 may be configured to receive and/or transmit data using any protocol that may be used for communications between entities of the system 100. The communication interface 124 may additionally be in communication with the memory 122 and/or cipher control circuitry 126, such as via a bus.

The cipher control circuitry 126 may be embodied as various means, such as circuitry, hardware, a computer program product comprising computer readable program instructions stored on a computer readable medium (e.g., the memory 122) and executed by a processing device (e.g., the processor 120), or some combination thereof and, in one embodiment, is embodied as or otherwise controlled by the processor 120. In embodiments wherein the cipher control circuitry 126 is embodied separately from the processor 120, the cipher control circuitry 126 may be in communication with the processor 120. The cipher control circuitry 126 may comprise and/or be configured to perform at least some functionality of an RLC entity, PDCP entity, and/or the like. The cipher control circuitry 126 may further be in communication with one or more of the memory 122 or communication interface 124, such as via a bus.

It will be appreciated that in some embodiments, the receiving apparatus 102 is configured to perform at least some of the functionality of the sending apparatus 104 as described herein. In this regard, the receiving apparatus 102 may comprise cipher control circuitry 126 that may be embodied as or otherwise controlled by the processor 110. Similarly, in some embodiments, the sending apparatus 104 is configured to perform at least some of the functionality of the receiving apparatus 102 as described herein. In this regard, the sending apparatus 104 may comprise decipher control circuitry 118 that may be embodied as or otherwise controlled by the processor 120. Accordingly, embodiments of the invention may facilitate ciphering error detection and recovery for both a network uplink and a network downlink.

The cipher control circuitry 126 is configured in some embodiments to cipher data in a protocol data unit (PDU) that is to be transmitted to the receiving apparatus 102. The PDU may comprise an RLC PDU, PDCP PDU, or the like. The PDU may comprise an unacknowledged mode (UM) PDU such that the receiving apparatus 102 is not required to acknowledge receipt of a UM PDU. Alternatively, the PDU may comprise an acknowledged mode (AM) PDU such that the receiving apparatus 102 is required to acknowledge receipt of the PDU. The PDU may be associated with any of a variety of service types of communication exchanged between the receiving apparatus 102 and the sending apparatus 104 or other device over the network 108. The service type comprises a higher layer communication application which is supported by the PDU(s) transmitted to the receiving apparatus 102. For example, the service type may comprise circuit switched (CS) voice communication transmitted over High Speed Packet Access (HSPA). In another example, the service type may comprise voice over Internet protocol (VoIP), streaming service, or other real time service. The cipher control circuitry 126 may be configured to cipher the data using a set of one or more cipher input parameters. The set of one or more cipher input parameters may comprise, for example, one or more of a ciphering key (CK), COUNT-C, BEARER (e.g., radio bearer identity), LENGTH (e.g., length of DATA), DATA (e.g., a data parameter to be ciphered), or the like. The COUNT-C value may comprise and/or be defined based at least in part on a Hyper Frame Number (HFN) and a sequence number (e.g., an RLC sequence number (RLC SN)). The HFN may comprise a field initialized to a start value exchanged between the sending apparatus 104 and receiving apparatus 102 during radio bearer setup. The RLC SN may comprise a sequence number included in a PDU header and may be incremented by 1 at each transmission of a PDU. The cipher control circuitry 126 may use the set of cipher input parameters to cipher the data using any codec, such as, for example, Adaptive Multi-Rate (AMR) codec, AMR-Wideband (AMR-WM), and/or the like.

The cipher control circuitry 126 may be preconfigured to include a ciphered 'expected value' in a PDU to be transmitted to the receiver apparatus 102. The expected value may comprise a value of a padding field, a length indicator, a PDU header, a field currently defined as an R field (e.g., in a PDCP PDU), and/or other value. For example, a padding field may comprise one or more bits having a value expected by the receiving apparatus 102 that are included in the PDU to provide for octet alignment of data within the PDU. In another example, a length indicator may indicate the last octet of each RLC service data unit included in the PDU (e.g., '1111101' for CS voice over HSPA). Thus, the expected value may indicate the PDU size or other value expected by the receiving apparatus 102. In yet another example, the PDU header may comprise a value indicating a PDCP type with which the PDCP PDU is associated (e.g., '010' PDCP AMR Data PDU for CS voice over HSPA, '000' PDCP Data PDU for VoIP, and/or the like).

In some embodiments, the 'expected value' is predefined based on the configuration of the system 100. Additionally or alternatively, the cipher control circuitry 126 and decipher control circuitry 118 may be configured to independently determine an expected value based at least in part upon a communication service type for which data is being exchanged between the receiving apparatus 102 and sending apparatus 104 (e.g., an expected value of the PDU header). In another example, the cipher control circuitry 126 may be configured to define an expected value and provide the expected value to the receiving apparatus 102 during a communication setup phase (e.g., during radio bearer setup, during RLC resynchronization, and/or the like).

Once a PDU including the value expected by the receiving apparatus 102 is ciphered, the communication interface 124 may transmit the PDU to the receiving apparatus 102, where it may be received by the communication interface 114. The decipher control circuitry 118 is configured in some embodiments of the invention to use a set of one or more cipher input parameters maintained by the decipher control circuitry 118 to decipher ciphered data in a received PDU. The set of one or more cipher input parameters may comprise, for example, one or more of a ciphering key (CK), COUNT-C, BEARER (e.g., radio bearer identity), LENGTH (e.g., length of DATA), DATA (e.g., a data parameter to be deciphered), or the like. The decipher control circuitry 118 may be configured to use the set of cipher input parameters to decipher the data using any codec used by the cipher control circuitry 126 to cipher the data.

After the decipher control circuitry 118 has deciphered the ciphered data, the decipher control circuitry 118 is configured in some embodiments of the invention to compare a value of at least a portion of the deciphered data to the expected value. As described above, the expected value expected by the decipher control circuitry 118 may be preconfigured, selected by the cipher control circuitry 126 and determined by the decipher control circuitry 118 based at least in part upon network signaling received by the terminal 102, determined by the decipher control circuitry 118 based at least in part upon a service type with which a received PDU is associated, and/or the like. The at least a portion of the deciphered data may comprise the portion (e.g., header, field, and/or the like) of the PDU in which the expected value is located. When the value of the at least a portion of the deciphered data is not equal to the expected value, the decipher control circuitry 118 is configured in some embodiments to determine an occurrence of a ciphering error. In this regard, if the set of ciphering inputs used by the decipher control circuitry 118 to decipher the data are synchronized with the set of ciphering inputs used by the cipher control circuitry 126 to cipher the data, the at least a portion of the deciphered data should equal the expected value.

The decipher control circuitry 118 is configured in some embodiments to initiate a ciphering resynchronization procedure in response to the determination that a ciphering error occurred so as to resynchronize at least one of the set of cipher input parameters used by the decipher control circuitry 118 to decipher ciphered data in a received PDU ("the first set of cipher input parameters") with at least one of a set of cipher input parameters used by the cipher control circuitry 126 to cipher data in a PDU transmitted to the receiving apparatus 102 ("the second set of cipher input parameters"). In this regard, resynchronizing at least one of the first set of cipher input parameters with at least one of the second set of cipher input parameters may comprise, for example, the decipher control circuitry 118 autonomously updating one or more cipher input parameters of the first set, the decipher control circuitry 118 updating one or more cipher input parameters of the first set based upon signaling exchanged with the sending apparatus 104, the decipher control circuitry 118 and cipher control circuitry 126 of the same sending apparatus 104 establishing one or more synchronized cipher input parameters for the first and second sets in a setup phase (e.g. radio bearer setup and/or security mode command procedure), and/or the decipher control circuitry 118 and cipher control circuitry 126 of a different sending apparatus 104 establishing one or more synchronized ciphering inputs for the first and second sets in a setup phase (e.g. radio bearer setup, radio bearer reconfiguration and/or security mode command procedure).

In some embodiments the decipher control circuitry 118 is configured to initiate a ciphering resynchronization procedure by initiating an RLC resynchronization procedure (e.g., an RLC re-establishment procedure when operating in UM or AM mode, an RLC reset procedure when operating in AM mode, and/or the like) to initialize at least one cipher input parameter such that the first set of cipher input parameters is resynchronized with the second set of cipher input parameters. In this regard, the receiving apparatus 102 and a sending apparatus 104 may engage in a cell update procedure and the decipher control circuitry 118 and cipher control circuitry 126 may initiate an RLC re-establishment or other RLC resynchronization procedure as part of the cell update procedure so that the decipher control circuitry 118 and cipher control circuitry 126 may initialize at least one synchronized cipher input parameter (e.g., COUNT-C value, UM RLC SN, and/or the like).

Additionally or alternatively, in some embodiments, the decipher control circuitry 118 is configured to initiate an autonomous ciphering resynchronization procedure. In this regard, the decipher control circuitry 118 may be configured to select a most probable alternative value for at least one of the first set of cipher input parameters. The most probable alternative value may, for example, comprise an incremented value of a cipher input parameter when the cipher input parameter comprises a parameter that is incremented with each received PDU. For example, the decipher control circuitry may be configured to increment the HFN value of COUNT-C to the current HFN value of COUNT-C+1 as the most probable alternative value. The decipher control circuitry 118 may then use the selected most probable alternative value for the at least one of the first set of cipher input parameters to decipher data in the received PDU for which a ciphering error occurred or to decipher data in a subsequently received PDU. If the selected at least one most probable alternative value for a cipher input parameter(s) is the correct synchronized value(s), then at least a portion of the deciphered data will equal the expected value. If the at least a portion of the deciphered data does not equal the expected value, then the first and second sets of cipher input parameters are still not synchronized and the decipher control circuitry 118 may be configured to again select a most probable alternative value for one or more cipher input parameters and attempt deciphering a received PDU again. The decipher control circuitry 118 may be configured to repeat the process of selecting a most probable alternative for one or more cipher input parameters until the decipher control circuitry 118 has autonomously resynchronized at least one parameter of the first set of cipher input parameters with at least one parameter of the second set of cipher input parameters. Additionally or alternatively, the decipher control circuitry 118 may be configured to repeat the process of selecting a most probable alternative for one or more cipher input parameters until the decipher control circuitry 118 has made a predefined number of failed attempts to select a most probable alternative for one or more cipher input values, at which point the decipher control circuitry 118 may be configured to initiate an RLC resynchronization as described above to initialize at least one cipher input parameter with a sending apparatus 104. The predefined number of failed attempts at autonomous resynchronization may, for example, be signaled to the receiving apparatus 102 through network signaling (e.g., from the sending apparatus 104) or the decipher control circuitry 118 may be preconfigured to make the predefined number of failed attempts prior to initiating an RLC resynchronization.

In some embodiments, the decipher control circuitry 118 is not configured to initiate a ciphering resynchronization procedure in response to each determination that a ciphering error occurred, but rather is configured to initiate a ciphering resynchronization procedure after a predefined number of consecutive ciphering errors have occurred (e.g., for a predefined number of consecutively received PDUs). The predefined number may comprise a natural number greater than zero. The decipher control circuitry 118 may be preconfigured for the predefined number. In another example, the decipher control circuitry 118 may be configured to determine the predefined number based at least in part upon a service type with which the PDUs are associated (e.g, the predefined number may equal 3 for CS voice over HSPA and 10 for streaming service). Additionally or alternatively, the decipher control circuitry 118 may be configured to determine the predefined number based at least in part upon a received network signaling message transmitted by the sending apparatus 104. In this regard, the cipher control circuitry 126 may be configured to determine a predefined number of consecutive ciphering errors that the decipher control circuitry 118 is to detect prior to initiating a ciphering resynchronization procedure. The cipher control circuitry 126 may then generate a network signaling message for transmission to the receiving apparatus 102 by the communication interface 124 that defines the determined predefined number. In embodiments wherein the decipher control circuitry 118 is configured to initiate a ciphering resynchronization procedure after a predefined number of consecutive ciphering errors have occurred, the decipher control circuitry 118 may be configured to alter a counter value based at least in part upon a number of consecutive ciphering errors that have occurred upon determining an occurrence of a ciphering error and initiate a ciphering resynchronization procedure based at least in part upon a predefined relationship between the counter value and the predefined number. For example, the decipher control circuitry 118 may be configured to increment or decrement the counter value when the decipher control circuitry 118 determines an occurrence of a ciphering error and initiate a ciphering resynchronization procedure when the counter value equals a threshold values, such as, for example, the predefined number (e.g., if incrementing from an initial counter value of zero) or zero (e.g., if decrementing from an initial counter value of the predefined number). It will be appreciated, however, that incrementing and decrementing the counter value are provided merely as examples of how the decipher control circuitry 118 is configured to adjust a counter value in some embodiments of the invention. Further, the example initial values and threshold values are provided merely as examples and the decipher control circuitry 118 may be configured to use other initial values and threshold values.

In some embodiments the decipher control circuitry 118 is configured to enable ciphering error detection and check for an occurrence of a ciphering error only when one or more conditions are met. For example, the decipher control circuitry 118 may be configured to enable ciphering error detection only when it is configured to by the sending apparatus 104, such as through network signaling transmitted to the receiving apparatus 102 by the sending apparatus 104. In this regard, the cipher control circuitry 126 may be configured to enable and/or disable ciphering error detection by the decipher control circuitry 118 by initiating a network signaling enabling and/or disabling ciphering error detection for transmission to the receiving apparatus 102 by the sending apparatus 104. The network signaling may additionally comprise an indication of a predefined number of consecutive ciphering errors that the decipher control circuitry 118 must detect have occurred prior to initiating a ciphering resynchronization procedure. Additionally or alternatively, the decipher control circuitry 118 may be configured to enable ciphering error detection based at least in part upon a service type with which a received PDU is associated.

Figure 3:
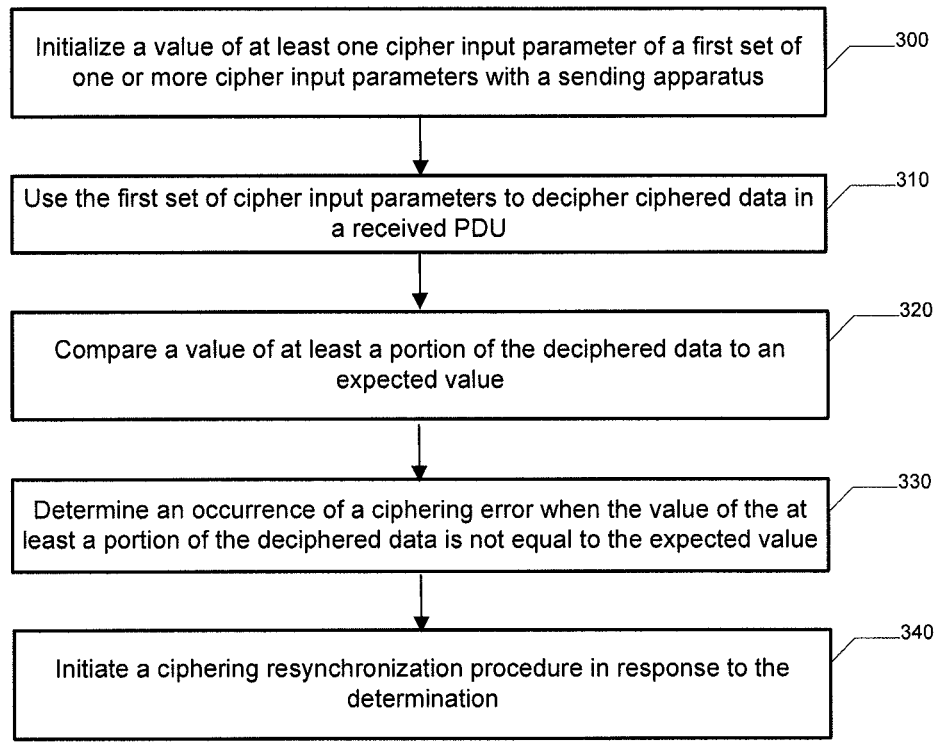
FIG. 3 illustrates a flowchart according to an exemplary method for ciphering error detection and recovery according to an exemplary embodiment of the invention.

FIG. 3 illustrates a flowchart according to an exemplary method for ciphering error detection and recovery according to an exemplary embodiment of the invention. In this regard, FIG. 3 illustrates operations that may be performed by the decipher control circuitry 118. The method may include the decipher control circuitry 118 initializing a value of at least one cipher input parameter of a first set of one or more cipher input parameters with a sending apparatus 104, at operation 300. Operation 310 may comprise the decipher control circuitry 118 using the first set of cipher input parameters to decipher ciphered data in a received PDU. The decipher control circuitry 118 may then compare a value of at least a portion of the deciphered data to an expected value, at operation 320. Operation 330 may comprise the decipher control circuitry 118 determining an occurrence of a ciphering error when the value of the at least a portion of the deciphered data is not equal to the expected value. The decipher control circuitry 118 may then initiate a ciphering resynchronization procedure in response to the determination, at operation 340.

Figure 4:
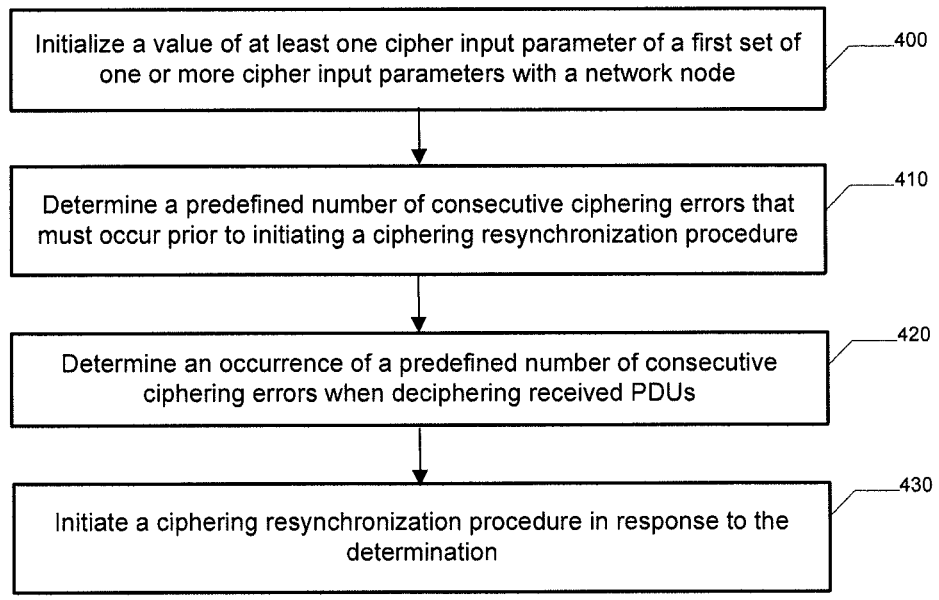
FIG. 4 illustrates a flowchart according to an exemplary method for ciphering error detection and recovery according to an exemplary embodiment of the invention.

FIG. 4 illustrates a flowchart according to an exemplary method for ciphering error detection and recovery according to an exemplary embodiment of the invention. In this regard, FIG. 4 illustrates operations that may be performed by the decipher control circuitry 118. The method may comprise the decipher control circuitry 118 initializing a value of at least one cipher input parameter of a first set of one or more cipher input parameters with a sending apparatus 104, at operation 400. Operation 410 may comprise the decipher control circuitry 118 determining a predefined number of consecutive ciphering errors that must occur prior to initiating a ciphering resynchronization procedure, at operation 410. The decipher control circuitry 118 may make the determination of operation 410 based at least in part upon network signaling transmitted by the sending apparatus 104 and/or a service type with which a received PDU is associated. Operation 420 may comprise the decipher control circuitry 118 determining an occurrence of a predefined number of consecutive ciphering errors when deciphering consecutively received PDUs. The decipher control circuitry 118 may then initiate a ciphering resynchronization procedure in response to the determination of operation 420, at operation 430.

Figure 5:
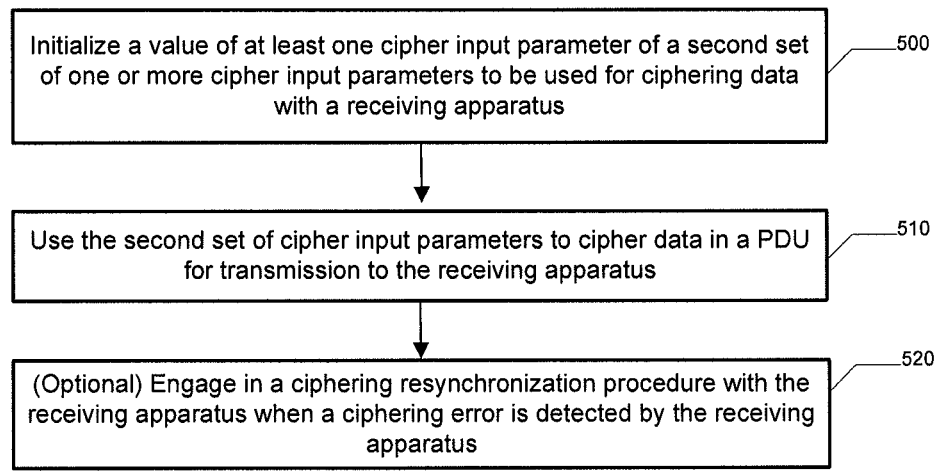
FIG. 5 illustrates a flowchart according to an exemplary method for ciphering error detection and recovery according to an exemplary embodiment of the invention.

FIG. 5 illustrates a flowchart according to an exemplary method for ciphering error detection and recovery according to an exemplary embodiment of the invention. In this regard, FIG. 5 illustrates operations that may be performed by the cipher control circuitry 126. Operation 500 may comprise the cipher control circuitry 126 initializing a value of at least one cipher input parameter of a second set of one or more cipher input parameters to be used for ciphering data with a receiving apparatus 102. The cipher control circuitry 126 may then use the second set of cipher input parameters to cipher data in a PDU for transmission to the receiving apparatus 102, at operation 510. Operation 520 may optionally comprise the cipher control circuitry engaging in a ciphering resynchronization procedure with the receiving apparatus 102 when a ciphering error is detected by the receiving apparatus. Operation 520 may be performed in embodiments wherein the decipher control circuitry 118 is configured to initiate an RLC resynchronization.

Figure 6:
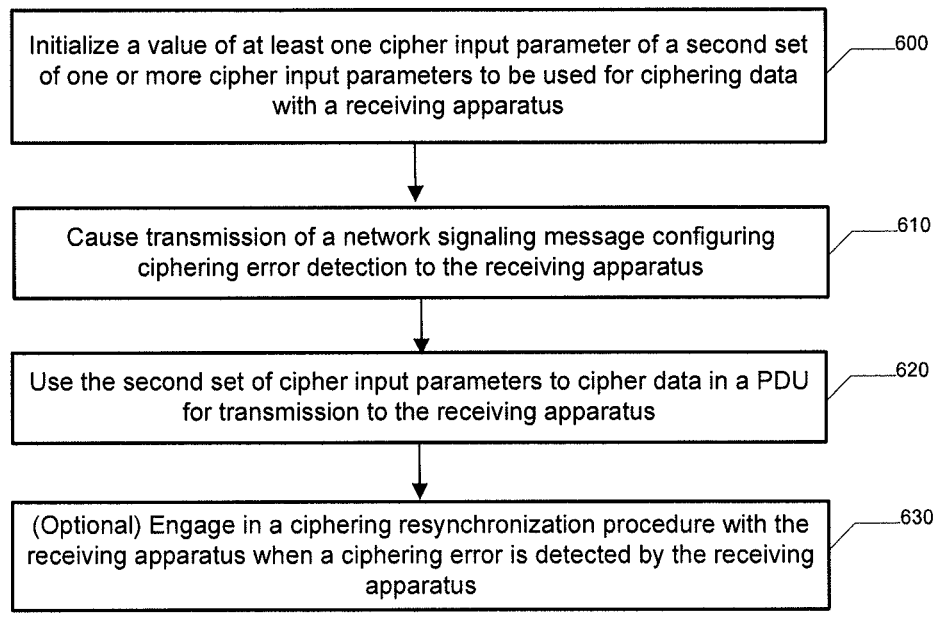
FIG. 6 illustrates a flowchart according to an exemplary method for ciphering error detection and recovery according to an exemplary embodiment of the invention.

FIG. 6 illustrates a flowchart according to an exemplary method for ciphering error detection and recovery according to an exemplary embodiment of the invention. In this regard, FIG. 6 illustrates operations that may be performed by the cipher control circuitry 126. Operation 600 may comprise the cipher control circuitry 126 initializing a value of at least one cipher input parameter of a second set of one or more cipher input parameters to be used for ciphering data with a receiving apparatus 102. The cipher control circuitry 126 may then cause transmission of a network signaling message configuring ciphering error detection to the receiving apparatus 102. The network signaling message may comprise instructions enabling ciphering error detection by the receiving apparatus 102, instructions defining a predefined number of consecutive ciphering errors that the receiving apparatus 102 is to determine have occurred prior to initiating a ciphering resynchronization procedure, and/or a predefined number of failed attempts at autonomous resynchronization the receiving apparatus 102 is to make prior to initiating an RLC resynchronization procedure. The cipher control circuitry 126 may then use the second set of cipher input parameters to cipher data in a PDU for transmission to the receiving apparatus 102, at operation 620. Operation 630 may optionally comprise the cipher control circuitry engaging in a ciphering resynchronization procedure with the receiving apparatus 102 when a ciphering error (e.g., a predefined number of consecutive ciphering errors) is detected by the receiving apparatus. Operation 630 may be performed in embodiments wherein the decipher control circuitry 118 is configured to initiate an RLC resynchronization.

FIGS. 3-6 are flowcharts of a system, method, and computer program product according to exemplary embodiments of the invention. It will be understood that each block or step of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a receiving apparatus 102, sending apparatus 104, mobile terminal, server, or other computing device and executed by a processor in the computing device (e.g. the processor 110 and/or processor 120). In some embodiments, the computer program instructions comprising the computer program product(s) which embody the procedures described above may be stored by memory devices of a plurality of computing devices. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s) or step(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s) or step(s). The computer program instructions of one or more computer program products may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions and combinations of steps for performing the specified functions. It will also be understood that one or more blocks or steps of the flowchart, and combinations of blocks or steps in the flowchart, may be implemented by special purpose hardware-based computer systems which perform the specified functions or steps, or combinations of special purpose hardware and computer program product(s).

The above described functions may be carried out in many ways. For example, any suitable means for carrying out each of the functions described above may be employed to carry out embodiments of the invention. In one embodiment, a suitably configured processor may provide all or a portion of the elements of the invention. In another embodiment, all or a portion of the elements of the invention may be configured by and operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

As such, then, some embodiments of the invention provide several advantages to computing devices, computing device users, and network operators. Embodiments of the invention provide a receiving apparatus configured to determine an occurrence of a ciphering error. In this regard, embodiments of the invention provide a receiving apparatus configured to determine an occurrence of a ciphering error by comparing a value of deciphered data to an expected value to determine if the value of the deciphered data is equal to the expected value. This comparison allows for some embodiments of the invention to determine an occurrence of a ciphering error regardless of a service type with which a ciphered protocol data unit is associated. Embodiments of the invention provide a receiving apparatus 102 configured to determine an occurrence of a ciphering error in situations wherein a cyclic redundancy check (CRC) for CRC protected data may fail.

Embodiments of the invention further provide a receiving apparatus configured to initiate a ciphering error recovery procedure so as to resynchronize a local set of one or more cipher input parameters used to decipher received ciphered data with a set of one or more cipher input parameters used by a sending apparatus to cipher the ciphered data prior to transmission to the terminal. Some embodiments of the invention provide a receiving apparatus configured to initiate a radio link control resynchronization with a sending apparatus to resynchronize one or more cipher input parameters. Embodiments of the invention also provide a receiving apparatus configured to autonomously resynchronize one or more cipher input parameters by selecting a most probable alternative value for at least one cipher input parameter. Embodiments of the invention providing for network signaling configuration of ciphering error detection and/or ciphering error recovery procedures eliminate inter-operability issues that may occur when a receiving apparatus configured to determine an occurrence of a ciphering error and/or initiate a ciphering error recovery procedure is communicating over a network not configured to support a ciphering error recovery procedure.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
receiving, from an external source, a signal comprising a numeric value indicating a predefined number of failed resynchronization attempts;
using a first set of one or more cipher input parameters to decipher ciphered data in a received protocol data unit (PDU) to generate a first set of deciphered data, wherein the ciphered data was ciphered using a second set of one or more cipher input parameters;
comparing a first value of at least a portion of the first set of deciphered data to an expected value;
determining, with decipher control circuitry, an occurrence of a ciphering error when the value of the at least a portion of the deciphered data is not equal to the expected value;
initiating a ciphering resynchronization procedure in response to the determination that a ciphering error occurred so as to resynchronize at least one of the first set of cipher input parameters with at least one of the second set of cipher input parameters; and
initiating a radio link control (RLC) resynchronization in response to a failure of the ciphering resynchronization procedure;
wherein the ciphering resynchronization procedure comprises:
selecting a most probable alternative value for at least one of the first set of cipher input parameter, said most probable alternative comprising an incremented value of a cipher input parameter when the cipher input parameter comprises a parameter that is incremented with each received PDU;
deciphering data in one of the received PDU for which a ciphering error occurred or in a subsequently received PDU;
comparing at least a portion of the deciphered data to the expected value;
repeating the most probable alternative cipher parameter selection and deciphering until a number of repeat attempts exceeds the predefined number of failed resynchronization attempts; and
determining that the ciphering resynchronization procedure has failed in response to the number of repeat attempts exceeding the predefined number of failed resynchronization attempts.

2. The method of claim 1, further comprising:
adjusting a counter value based at least in part upon a number of consecutive ciphering errors that have occurred when deciphering ciphered data in received protocol data units; and wherein
initiating the ciphering resynchronization procedure comprises initiating a ciphering resynchronization procedure when the counter value has a predefined relationship with a predefined number, wherein the predefined number comprises a natural number greater than zero.

3. The method of claim 2, further comprising determining the predefined number based at least in part upon one or more of a message transmitted by a sending apparatus or a service type with which the protocol data units are associated.

4. The method of claim 1, wherein initiating a ciphering resynchronization procedure comprises initiating a radio link control resynchronization procedure to initialize at least one cipher input parameter such that the first set of cipher input parameters is resynchronized with the second set of cipher input parameters.

5. The method of claim 1, wherein the third set of one or more cipher input parameters includes a most probable alternative value.

6. The method of claim 1, wherein the at least a portion of the deciphered data comprises one or more of a padding field, a length indicator, or a protocol data unit header.

7. The method of claim 1, wherein the protocol data unit comprises an unacknowledged mode radio link control layer protocol data unit, an acknowledged mode radio link control layer protocol data unit, an unacknowledged mode packet data convergence protocol protocol data unit, or an acknowledged mode packet data convergence protocol data unit.

8. An apparatus comprising at least one processor and at least one memory storing computer program code, wherein the at least one memory and stored computer program code are configured to, with the at least one processor, cause the apparatus to at least:
receive, from a source other than the apparatus, a signal comprising a numeric value indicating a predefined number of failed resynchronization attempts;
use a first set of one or more cipher input parameters to decipher ciphered data in a received protocol data unit to generate a first set of deciphered data, wherein the ciphered data was ciphered using a second set of one or more cipher input parameters;
compare a value of at least a portion of the first set of deciphered data to an expected value;
determine an occurrence of a ciphering error when the value of the at least a portion of the deciphered data is not equal to the expected value;
initiate a ciphering resynchronization procedure in response to the determination that a ciphering error occurred so as to resynchronize at least one of the first set of cipher input parameters with at least one of the second set of cipher input parameters;
and
initiate radio link control (RLC) resynchronization in response to a failure of the ciphering resynchronization procedure;
wherein the ciphering resynchronization procedure comprises:
selecting a most probable alternative value for at least one of the first set of cipher input parameter, said most probable alternative comprising an incremented value of a cipher input parameter when the cipher input parameter comprises a parameter that is incremented with each received PDU;
deciphering data in one of the received PDU for which a ciphering error occurred or in a subsequently received PDU;
comparing at least a portion of the deciphered data to the expected value;
repeating the most probable alternative cipher parameter selection and deciphering until a number of repeat attempts exceeds the predefined number of failed resynchronization attempts; and determining that the ciphering resynchronization procedure has failed in response to the number of repeat attempts exceeding the predefined number of failed resynchronization attempts.

9. The apparatus of claim 8, wherein the at least one memory and stored computer program code are configured to, with the at least one processor, further cause the apparatus to:
adjust a counter value based at least in part upon a number of consecutive ciphering errors that have occurred when deciphering ciphered data in received protocol data units; and wherein
the at least one memory and stored computer program code are configured to, with the at least one processor, cause the apparatus to initiate the ciphering resynchronization procedure by initiating a ciphering resynchronization procedure when the counter value has a predefined relationship to a predefined number, wherein the predefined number comprises a natural number greater than zero.

10. The apparatus of claim 9, wherein the at least one memory and stored computer program code are configured to, with the at least one processor, further cause the apparatus to determine the predefined number based at least in part upon one or more of a message transmitted by a sending apparatus or a service type with which the protocol data units are associated.

11. The apparatus of claim 8, wherein the at least one memory and stored computer program code are configured to, with the at least one processor, cause the apparatus to initiate a ciphering resynchronization procedure by initiating a radio link control resynchronization procedure to initialize at least one cipher input parameter such that the first set of cipher input parameters is resynchronized with the second set of cipher input parameters.

12. The apparatus of claim 8, wherein the third set of one or more cipher input parameters includes a most probable alternative value.

13. The apparatus of claim 8, wherein the at least a portion of the deciphered data comprises one or more of a padding field, a length indicator, or a protocol data unit header.

14. The apparatus of claim 8, wherein the protocol data unit comprises an unacknowledged mode radio link control layer protocol data unit, an acknowledged mode radio link control layer protocol data unit, an unacknowledged mode packet data convergence protocol protocol data unit, or an acknowledged mode packet data convergence protocol data unit.

15. The apparatus of claim 8, wherein the apparatus comprises or is embodied on a mobile phone, the mobile phone comprising user interface circuitry and user interface software stored on one or more of the at least one memory; wherein the user interface circuitry and user interface software are configured to:
facilitate user control of at least some functions of the mobile phone through use of a display; and
cause at least a portion of a user interface of the mobile phone to be displayed on the display to facilitate user control of at least some functions of the mobile phone.

16. A computer program product comprising at least one non-transitory computer-readable storage medium having computer-readable program instructions stored therein, the computer-readable program instructions comprising:
program instructions configured for receiving, from an external source, a signal comprising a numeric value indicating a predefined number of failed resynchronization attempts;
program instructions configured for using a first set of one or more cipher input parameters to decipher ciphered data in a received protocol data unit to generate a first set of deciphered data, wherein the ciphered data was ciphered using a second set of one or more cipher input parameters;
program instructions configured for comparing a value of at least a portion of the deciphered data to an expected value;
program instructions configured for determining an occurrence of a ciphering error when the value of the at least a portion of the first set of deciphered data is not equal to the expected value;
program instructions configured for initiating a ciphering resynchronization procedure in response to the determination that a ciphering error occurred so as to resynchronize at least one of the first set of cipher input parameters with at least one of the second set of cipher input parameters; and
program instructions configured for initiating a radio link control (RLC) resynchronization in response to a failure of the ciphering resynchronization procedure;
wherein the ciphering resynchronization procedure comprises program instructions configured for:
selecting a most probable alternative value for at least one of the first set of cipher input parameter, said most probable alternative comprising an incremented value of a cipher input parameter when the cipher input parameter comprises a parameter that is incremented with each received PDU;
deciphering data in one of the received PDU for which a ciphering error occurred or in a subsequently received PDU;
comparing at least a portion of the deciphered data to the expected value;
repeating the most probable alternative cipher parameter selection and deciphering until a number of repeat attempts exceeds the predefined number of failed resynchronization attempts; and
determining that the ciphering resynchronization procedure has failed in response to the number of repeat attempts exceeding the predefined number of failed resynchronization attempts.

17. The computer program product of claim 16, further comprising:
program instructions configured for adjusting a counter value based at least in part upon a number of consecutive ciphering errors that have occurred when deciphering ciphered data in received protocol data units; and wherein
the program instructions configured for initiating the ciphering resynchronization procedure comprises instructions configured for initiating a ciphering resynchronization procedure when the counter value has a predefined relationship to a predefined number, wherein the predefined number comprises a natural number greater than zero.

18. The computer program product of claim 17, further comprising program instructions configured for determining the predefined number based at least in part upon one or more of a message transmitted by a sending apparatus or a service type with which the protocol data units are associated.

19. The computer program product of claim 16, wherein the program instructions configured for initiating a ciphering resynchronization procedure comprises instructions configured for initiating a radio link control resynchronization procedure to initialize at least one cipher input parameter such that the first set of cipher input parameters is resynchronized with the second set of cipher input parameters.

20. The computer program product of claim 16, the third set of one or more cipher input parameters includes a most probable alternative value.

\* \* \* \* \*